(12) United States Patent
Barwin et al.

(10) Patent No.: US 8,938,701 B2
(45) Date of Patent: Jan. 20, 2015

(54) METHOD OF MANAGING ELECTRO MIGRATION IN LOGIC DESIGNS AND DESIGN STRUCTURE THEREOF

(71) Applicant: International Business Machines Corporation, Armonk, NY (US)

(72) Inventors: John E. Barwin, Essex Junction, VT (US); Jeanne P. S. Bickford, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/967,030

(22) Filed: Aug. 14, 2013

(65) Prior Publication Data

US 2013/0332895 A1 Dec. 12, 2013

Related U.S. Application Data

(63) Continuation of application No. 12/686,457, filed on Jan. 13, 2010, now Pat. No. 8,560,990.

(51) Int. Cl.
*G06F 17/50* (2006.01)
(52) U.S. Cl.
CPC ........ *G06F 17/5081* (2013.01); *G06F 17/5068* (2013.01); *G06F 2217/12* (2013.01)
USPC .......................................... 716/104; 716/100
(58) Field of Classification Search
USPC ................................................ 716/100–108
See application file for complete search history.

(56) References Cited

U.S. PATENT DOCUMENTS

| | | | |
|---|---|---|---|
| 6,249,898 B1 | 6/2001 | Koh et al. | |
| 6,252,427 B1 | 6/2001 | Domae et al. | |
| 6,321,364 B1 | 11/2001 | Hirata | |
| 6,532,570 B1 * | 3/2003 | Mau | 716/130 |
| 6,578,178 B2 * | 6/2003 | Mau | 716/115 |
| 7,243,315 B2 | 7/2007 | Tan et al. | |
| 8,560,990 B2 * | 10/2013 | Barwin et al. | 716/111 |
| 2002/0040466 A1 | 4/2002 | Khazei | |
| 2003/0066036 A1 | 4/2003 | Mau | |
| 2009/0132972 A1 | 5/2009 | Jain et al. | |

FOREIGN PATENT DOCUMENTS

| | | |
|---|---|---|
| EP | 0335383 | 3/1989 |
| JP | 01238134 | 9/1989 |
| JP | 02132834 | 5/1990 |
| JP | 02312237 | 12/1990 |
| JP | 03192759 | 8/1991 |
| JP | 2004104039 | 4/2004 |

OTHER PUBLICATIONS

De Doo, Paul, "Impact of DFM and RET on Standard-Cell Design Methodology", Prolific, Inc., 8 Pages.

* cited by examiner

*Primary Examiner* — Binh Tat
(74) *Attorney, Agent, or Firm* — David Cain; Roberts Mlotkowski Safran & Cole, P.C.

(57) ABSTRACT

A method of designing an integrated circuit includes modifying a design attribute-variable electromigration (EM) limit for each pre-defined circuit based on at least one reliability constraint in order to avoid EM violations of an integrated circuit. The method further includes synthesizing the integrated circuit from a high level description to at least a subset of the pre-defined circuit devices using the modified design-variable EM limit of each pre-defined circuit.

13 Claims, 4 Drawing Sheets

METHOD OF MANAGING ELECTRO MIGRATION IN LOGIC DESIGNS AND DESIGN STRUCTURE THEREOF

FIELD OF THE INVENTION

The invention relates to a method of managing electro migration (EM) in logic designs and, more particularly, to a method of managing EM in standard cell based logic designs and a design structure thereof.

BACKGROUND

Integrated circuits conventionally comprise a substrate, semiconductor devices, and wiring (e.g., metallization) layers formed above the semiconductor devices. The wiring layers comprise various interconnects that provide electrical connections between the devices and external connections. However, as technology scales, power density increases and a wire's ability to transfer charge to active devices diminishes due to electromigration (EM). That is, as dimensions of features (e.g., pads, wires, interconnects, vias, etc.) continue to shrink to create smaller devices, the maximum allowable current density decreases rapidly due to (EM) effects.

EM is a well known phenomenon in which, generally speaking, atoms of a metal feature are displaced due to the electrical current passing through the feature. The migration of atoms can result in voids in the feature, which can increase electrical resistance or cause failure of the feature, both of which negatively impact reliability of the integrated circuit. For example, EM damage typically originates at a location of highest current density and then progresses until a wire is broken.

Industry solutions for EM management in logic design provide few available options. And, the solutions that exist are implemented late in the design cycle, and require considerable design system support. For example, if an EM violation is observed, redesign of the circuit is required to mitigate the violations. This is a time consuming and expensive process.

Accordingly, there exists a need in the art to overcome the deficiencies and limitations described hereinabove.

SUMMARY

In a first aspect of the invention, a method of designing an integrated circuit comprises modifying a design—variable electromigration (EM) limit for each pre-defined circuit based on at least one reliability constraint in order to avoid EM violations of an integrated circuit. The method further comprising synthesizing the integrated circuit from a high level description to at least a subset of the pre-defined circuit devices using the modified design—variable EM limit of each pre-defined circuit.

In another aspect of the invention, a computer program product comprises a computer usable storage medium having readable program code embodied in the storage medium. The computer program product includes at least one component operable to: modify a design—variable electromigration (EM) limit at a start of a design based on at least one reliability constraint of an integrated circuit; and provide the modification to a synthesizing tool to synthesize the integrated circuit from a high level description to at least a subset of pre-defined circuit devices using the modified design-variable EM limits.

In yet another aspect of the invention, a computer system is provided for designing an integrated circuit that avoid electro migration violations. The computer system comprises: a CPU, a computer readable memory and a computer readable storage media; first program instructions to provide a plurality of pre-defined circuit devices which are used within the integrated circuit, including an at least one design-variable electromigration (EM) limit; second program instructions to provide a high level description of the integrated circuit; third program instructions to provide at least one reliability constraint for the integrated circuit; fourth program instructions to modify the design-variable EM limit for each pre-defined circuit based on the at least one reliability constraint; and fifth program instructions to synthesize the integrated circuit from the high level description to at least a subset of the pre-defined circuit devices using the modified design-variable EM limit of each circuit. The first, second, third, fourth and fifth program instructions are stored on the computer readable storage media for execution by the CPU via the computer readable memory.

In still another aspect of the invention, a method comprises providing a computer infrastructure operable to: modify maximum capacitance or maximum output slew rate that each individual cell is allowed to drive in order to avoid electromigration (EM) fails; and provide the modification to a synthesizing tool to synthesize the integrated circuit from a high level description to at least a subset of pre-defined circuit devices using the modified design-variable EM limits.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
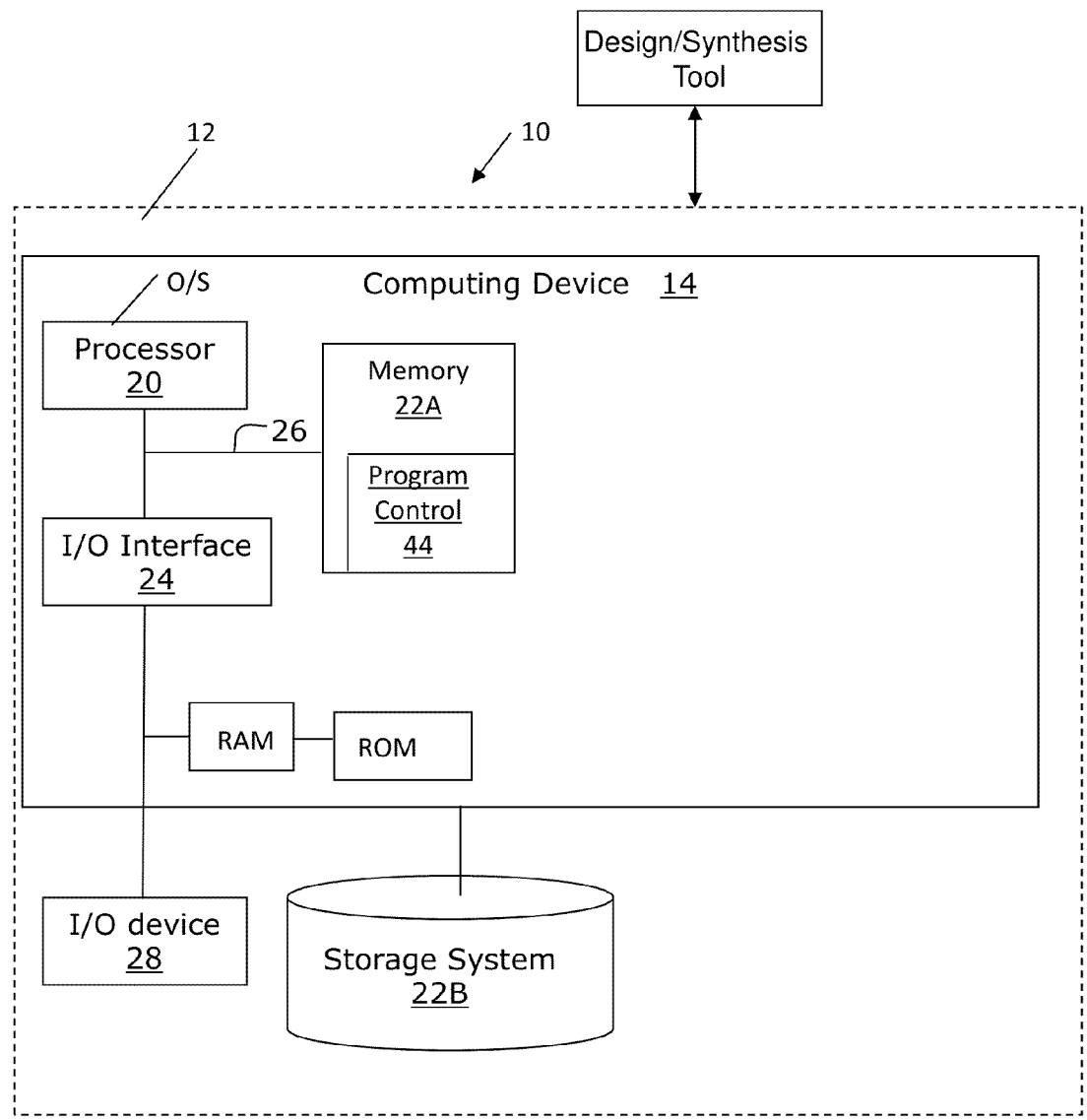
FIG. 1 shows an illustrative environment for implementing the steps in accordance with aspects of the invention.

The invention relates to a method of managing electro migration (EM) in logic designs and, more particularly, to a method of managing EM in standard cell based logic designs and a design structure thereof. More specifically, the present invention provides a method to calculate (e.g., avoid) potential EM violations during an early design cycle, e.g., prior to synthesis, in order to restrict the allowable loads on a circuit; compared to detecting and repairing the circuit design later in the design cycle, e.g., during simulation of the circuit. For example, by limiting the amount of capacitance or the amount of output slew on each standard cell EM can be controlled by design, rather than detected and repaired later in the design cycle. The invention also provides the opportunity to manage EM in Application Specific Integrated Circuit (ASIC) or foundry flows (vendor flows).

In implementing the present invention, by using available circuit information at the onset of the design cycle to modify maximum capacitance or maximum output slew rate that each individual cell is allowed to drive, it is possible to design a circuit early in the design cycle to avoid EM violations. And, by knowing EM violations prior to arriving at the layout of the circuit design, it is possible to save considerable time and expense during later design stages, e.g., simulation and testing, by not having to redesign the circuit. As should be understood by those of skill in the art, simulation is the process of verifying the functional characteristics of models at any level of abstraction.

In embodiments, EM logic design can be reduced to a basic concept of how much charge is moved through a limiting wire, and at what frequency, power on hours, temperature and/or voltage. (Frequency, power on hours, operational temperature and voltage are known at the onset of the design.) The standard format for describing the function, power, leakage, timing, etc., of a standard library cell in a chip design flow is, for example, the liberty file format (Synopsys™). In embodiments, constructs are available and are functional in the liberty file format, which may be used to limit either the maximum output slew or output capacitance on each output pin thereby avoiding the EM violation.

In embodiments, output pin metallization is defined in .lefs (Library Exchange Format) and GDSII files. Accordingly, in embodiments, the present invention provides a process flow (computing system) that will read the .lefs or GDSII to discern the output pin metallization. The process flow (computing system) will also take as input base liberty files, the application specific (user defined) frequency of operation, power on hours, temperature, and voltage (reliability) in order to calculate EM violations. Using the input information to calculate the maximum capacitance or maximum slew of each cell output, the process flow (computing system) can modify the liberty file to avoid EM violations when designing the circuit. Further chip or circuit design efforts can then continue normally, with EM escapes prevented from synthesis to final timing closure. Accordingly, the process flow (computing system) provides a method to limit design assumptions to prevent EM violations early in the flow by design.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:
an electrical connection having one or more wires,
a portable computer diskette,
a hard disk,
a random access memory (RAM),
a read-only memory (ROM),
an erasable programmable read-only memory (EPROM or Flash memory),
an optical fiber,
a portable compact disc read-only memory (CDROM),
an optical storage device,
a transmission media such as those supporting the Internet or an intranet, or
a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. The I/O device 28 can comprise any device that enables an individual to interact with the computing device 14 (e.g., user interface) or any device that enables the computing device 14 to communicate with one or more other computing devices using any type of communications link. The external I/O device/resource 28 may be, for example, a handheld device, PDA, handset, keyboard etc.

In embodiments, the storage system 22B may store, for example, liberty file formats, e.g., .lib files. The .lib file is an ASCII representation of the timing and power design attributes associated with any cell in a particular semiconductor technology. The timing and power design attributes are obtained by simulating the cells under a variety of conditions and the data is represented in the .lib format. More specifically, the .lib file contains timing models and data to calculate, for example, I/O delay path, timing check values and interconnect delays. In embodiments, this information can be used, for example, to calculate design a circuit without EM violations.

The liberty file formats may include, for example, a technology file (.tf), GDSII files (.gds), TDF files (.tdf), pad orientation information (.clf file), a constraints file (.sdc) that contains timing constraints and clock definitions, an EDIF netlist file (.edf) that contains connectivity information, and a design database file (.db) that contains netlist, timing, and design rule constraints. More specifically, the .sdc file can be a Synopsys Design Constraints file which is generally output by a synthesis tool such as Design Compiler, after synthesis of RTL to gates. The .gds file typically contains all the layouts of a standard cell library including, for example, the limitations that can be imposed on the metallization such as, for example, the maximum DC current that can be passed through the wires. The technology file .tf typically contains all the resistance and capacitance values for the metal layers. Additionally, there can be several design database files .db, e.g., a .lib based .db which is created by Library Compiler and a design database .db that is obtained after synthesis. The storage system 22B can also contain other circuit information such as, for example, frequency, KPOH (power on hours), reliability voltage and reliability temperature (end of life temperature). The present invention allows the same base rules to be supplied to the IP developer in order to avoid EM violations.

An example of a liberty file output pin definition for an inverter output pin is described as:

```
pin(Y) {
    direction : output ;
    function : "(!A)" ;
    max_capacitance : 80.000 ;
    max_transition : 200.000 ;
    min_capacitance : 1.2 ;
    related_ground_pin : VSS ;
    related_power_pin : VDD ;
```

As an example, the computing system will use the above information available at the onset of the design to modify the max_capacitance and/or max_transition to prevent the use of a circuit that will cause an EM fail. This limit, e.g., max_capacitance and/or max_transition, is used in synthesis and timing closure to create a "correct by design" approach circuit (avoiding EM violations).

In general, the processor 20 executes computer program code (e.g., program control 44), which can be stored in the memory 22A and/or storage system 22B. While executing the computer program code, the processor 20 can read and/or write data to/from memory 22A, storage system 22B, and/or I/O interface 24. The program code executes the processes of the invention such as, for example, calculating the maximum capacitance to avoid EM violations using the circuit information stored in the storage system 22B prior to entering into a design program such as, for example, a synthesis tool. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Flow Diagram

Figure 2:
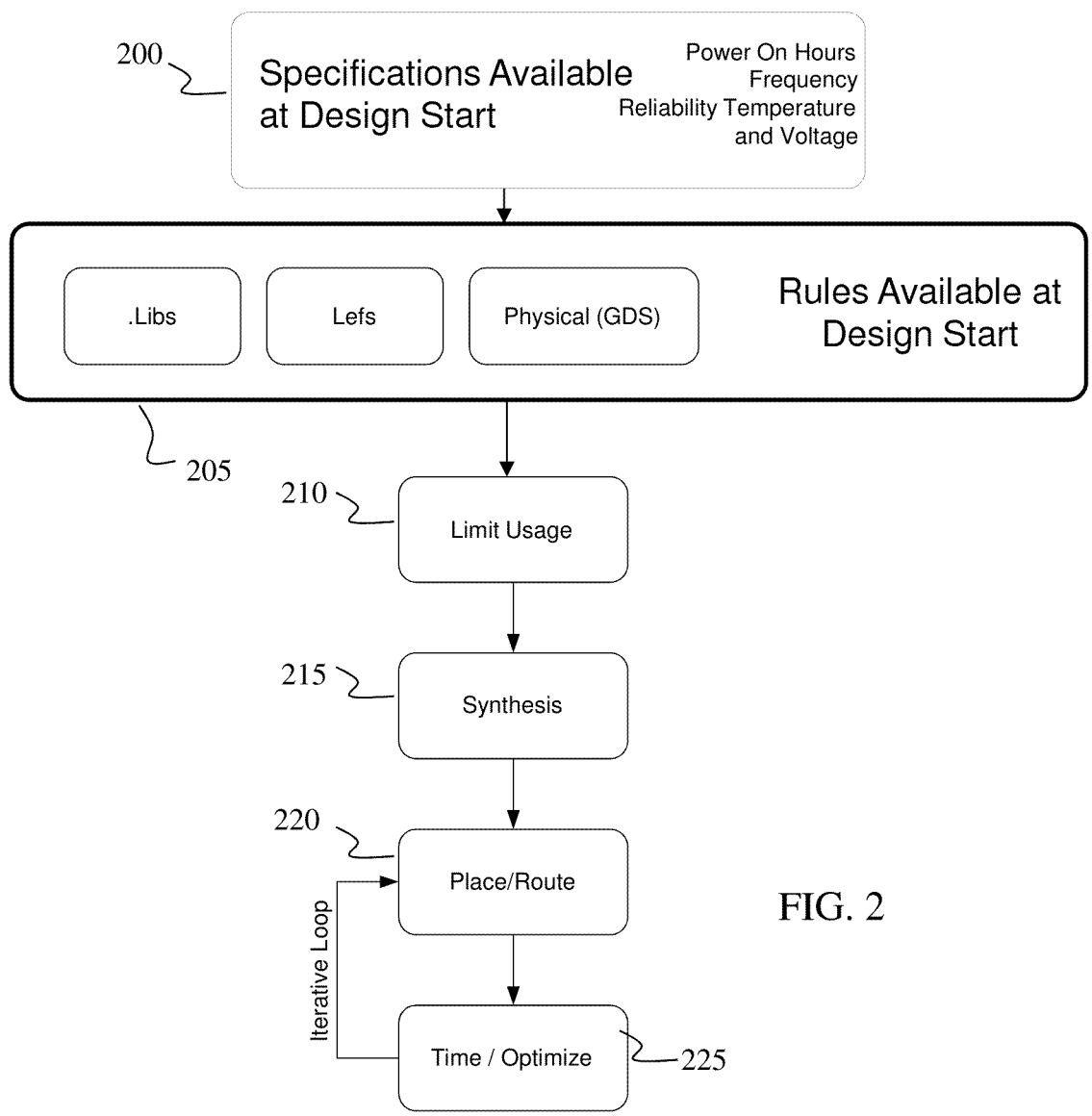
FIG. 2 shows a flow diagram implementing processes in accordance with aspects of the invention.

FIG. 2 shows a flow diagram implementing aspects of the present invention. The flow diagram of FIG. 2 can be implemented using the infrastructure of FIG. 1. The flow diagrams may equally represent a high-level block diagram or a swim-lane diagram of the invention. The flowchart and/or block diagram in FIG. 2 illustrates the architecture, functionality, and operation of possible implementations of systems, methods and computer program products according to various embodiments of the present invention. In this regard, each block in the flowchart, block diagram or swim-lane diagram may represent a module, segment, or portion of code, which comprises one or more executable instructions for implementing the specified logical function(s). It should also be noted that, in some alternative implementations, the functions noted in the blocks may occur out of the order noted in the figure. For example, two blocks shown in succession may, in fact, be executed substantially concurrently, or the blocks may sometimes be executed in the reverse order, depending upon the functionality involved. Each block of each flowchart, and combinations of the flowchart illustration can be implemented by special purpose hardware-based systems that perform the specified functions or acts, or combinations of special purpose hardware and computer instructions and/or software, as described above. Moreover, the steps of the flow diagram may be implemented and executed from either a server, in a client server relationship, or they may run on a user workstation with operative information conveyed to the user workstation. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

As shown in FIG. 2, a plurality of pre-defined circuit devices may be used within the integrated circuit. These circuit devices may include at least one design attributes-variable EM limit. A high level description of the integrated circuit and at least one reliability constraint for the integrated circuit (e.g., temperature, voltage, POH, etc) may also be provided. The system and method of the present invention modifies the design—variable EM limit for each pre-defined circuit based on the at least one reliability constraint. The present invention also synthesizes the integrated circuit from the high level description to at least a subset of the pre-defined circuit devices using the modified design—variable EM limits of each circuit thereby avoiding EM violations. The present invention can also provide the design-variable EM limit to a synthesis tool.

More specifically, at block 200, design specifications (e.g., reliability constraints) are made available at the design start. The specifications include the design attributes required for the design of the circuit. For example, these specifications include power on hours, frequency, reliability temperature and reliability voltage. At block 205, rules are made available at the design start. These rules include, for example, .libs, .lefs and physical design rule (GDS). The .libs may include, for example, timing and power requirements, size and functional view of the logic (e.g., NAND). The library format may also include, for example, a technology file (.tf), GDSII files (.gds), TDF files (.tdf), pad orientation information (.clf file), a constraints file (.sdc), an EDIF netlist file (.edf), and a design database file (.db). The .lefs can include physical models of pin hook-ups, etc. The physical design rule (GDS) can include, for example, the maximum current that can pass through the logic without causing EM failure.

At block 210, the program control will limit usage, e.g., limit the output capacitance that the cell can drive to avoid EM violations, by calculating the maximum output slew or output capacitance on each output pin using the available specifications and rules. In this way, the program control can modify design—variable EM limits of each circuit thereby avoiding EM violations. The equation used to calculate EM can be, for example:

$$MTTF = A(J^{-n})e^{Ea/kT}$$

where, A=Constant; J=Current Density; Ea=Energy Activation; K=Boltzmans Constant; and T=temperature in Kelvin. This equation shows that MTTF is a function of current density and temperature. It should be understood that other equations can also be used to calculate EM.

The current density through a fixed size wire in an inverter (lavg) can be increased by:
Increasing the load capacitance (Q=CV);
Increasing the voltage (Q=CV); or
Increasing the frequency (decreasing period Tp).
Since I=C dv/dt, it is possible to limit either the allowable capacitance or the output transition rate Ts (dv/dt) to limit the lavg.

At block 215, the program control will provide synthesis functions using the calculations in block 210. For example, the synthesis functions will construct a circuit design that will avoid EM fails. As should be understood by those of skill in the art, synthesis is the process in which synthesis tools like Design Compiler or Synplify™ take RTL in Verilog or VHDL, target technology, and constrains as input and maps the RTL to target technology primitives. The synthesis tools, after mapping the RTL to gates, can also perform timing analysis to determine whether the mapped design meets the timing requirements.

At block 220, the program control will provide place and route functions. For example, at block 220, the gate level netlist from the synthesis tool is imported into a place and route tool in, e.g., Verilog netlist format. At this design stage, the gates and flip-flops are placed and the clock tree synthesis and reset is routed. After this, each block is routed. In embodiments, a team performing physical design can dump out SPEF (standard parasitic exchange format)/RSPF (reduced parasitic exchange format)/DSPF (detailed parasitic exchange format) from layout tools to the frontend team, which then use, e.g., the read_parasitic command (in tools like Prime Time™) to write out SDF (standard delay format) for gate level simulation purposes. At block 225, the program control will time and optimize the circuit as should be understood by those of skill in the art. Blocks 220 and 225 will undergo an iterative loop until the design meets specifications, at which time a set of physical design layouts or models are provided for mask fabrication.

Figure 3:
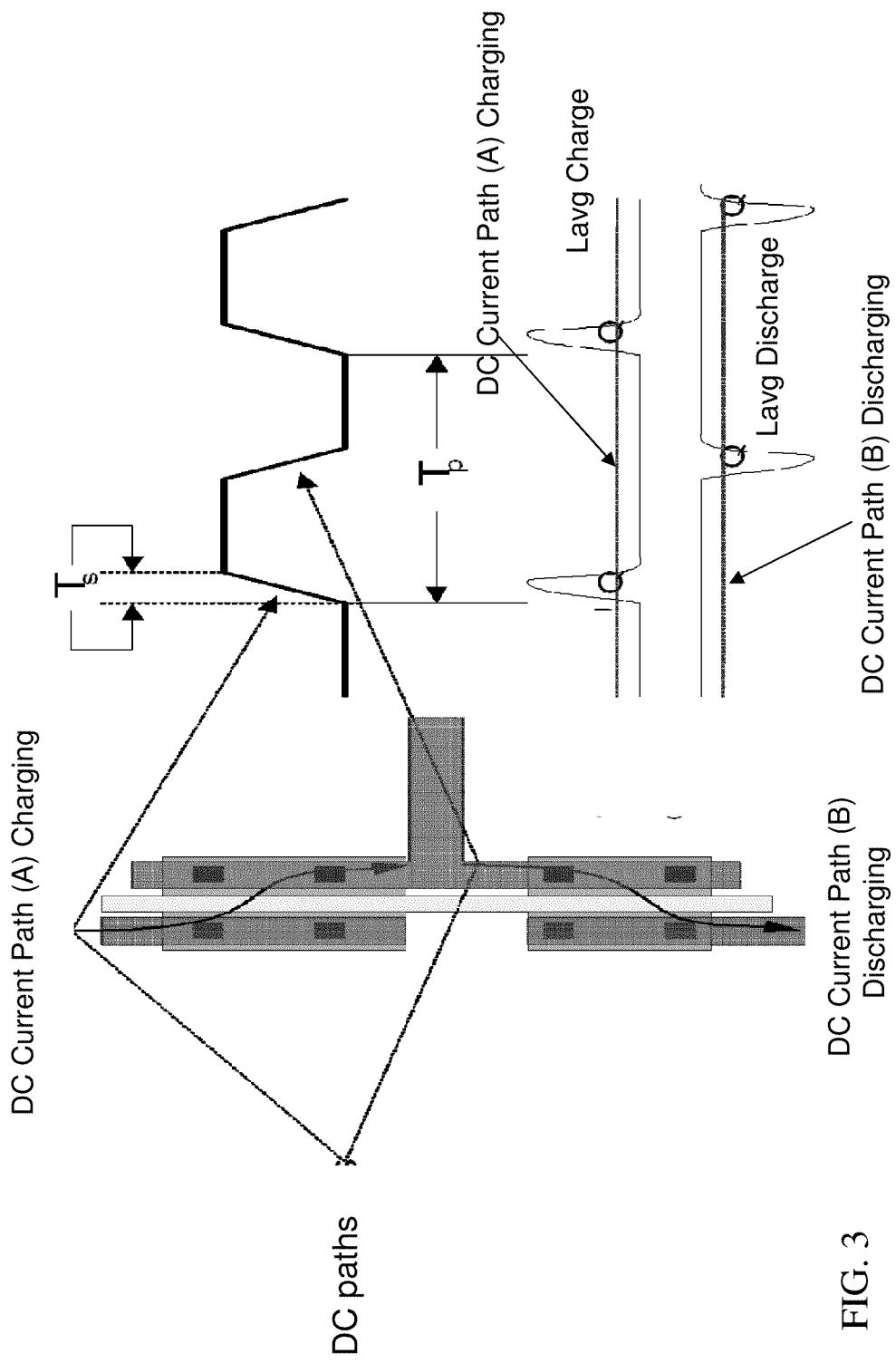
FIG. 3 shows an illustration of a GDS of an inverter, implementing aspects of the invention.

FIG. 3 shows an illustration of a GDS of an inverter in accordance with aspects of the invention. More specifically, FIG. 3 shows an inverter with DC paths 300. The DC paths include a DC current path (A) charging and a DC current path (B) discharging. The DC current path (A) and DC current path (B) are also represented by a profile showing Lavg charge and Lavg discharge. FIG. 3 further shows transition rate Ts and decreasing period Tp. As noted above, the current density through a fixed size wire in the inverter (lavg) can be increased by:
Increasing the load capacitance (Q=CV);
Increasing the voltage (Q=CV); or
Increasing the frequency (decreasing period Tp).
Since I=C dv/dt, it is possible, in accordance with the invention, to limit either the allowable capacitance or the output transition rate Ts (dv/dt) to limit the lavg.

Design Structure

Figure 4:
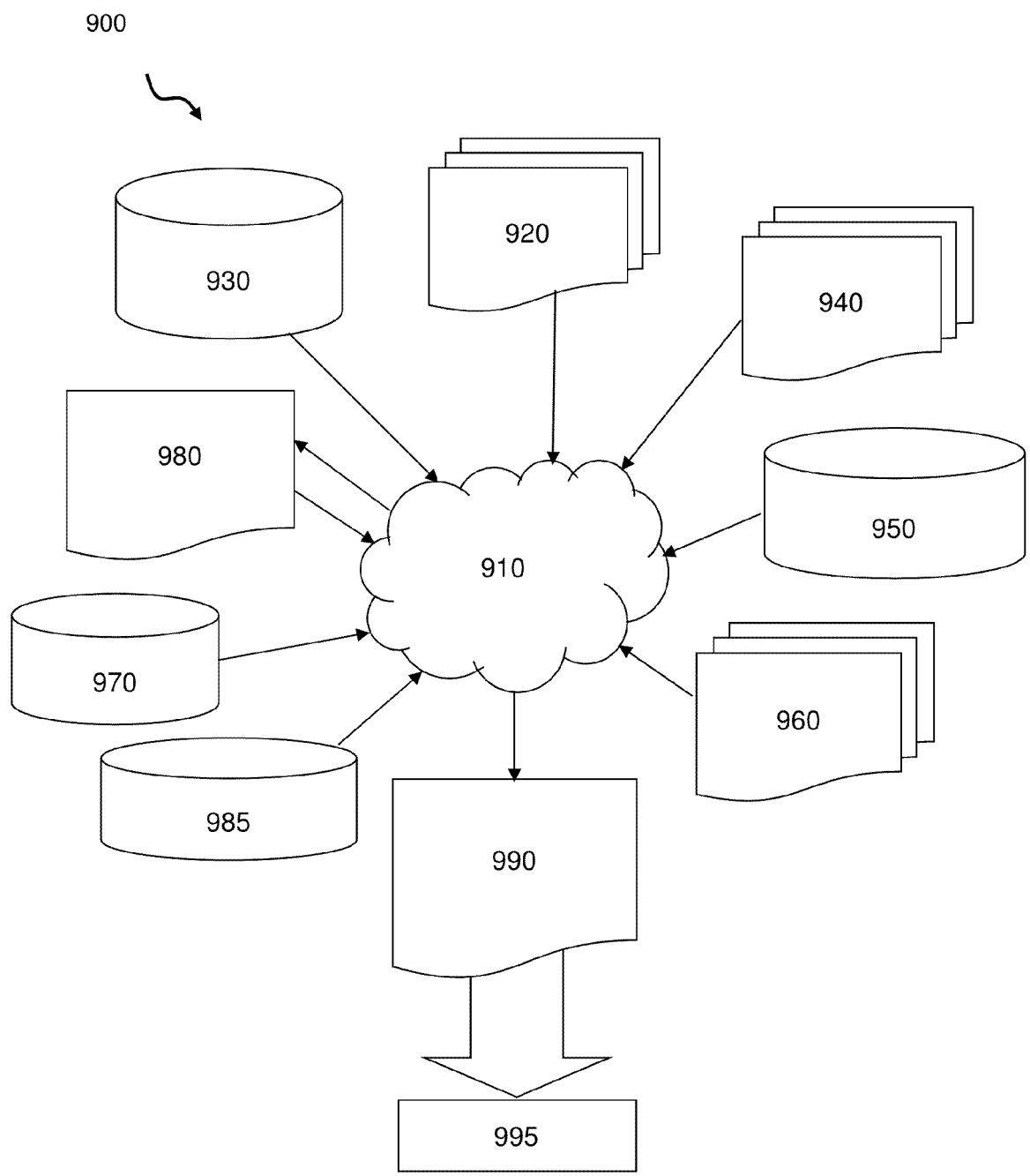
FIG. 4 shows a flow diagram of a design process used in semiconductor design, manufacture, and/or test.

FIG. 4 illustrates multiple design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system such as those shown in FIGS. 1-3. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures shown in FIGS. 1-3 to generate a netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and design attributes for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990. Design structure 990 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-3. In one embodiment, design structure 990 may comprise a compiled, executable HDL simulation model that functionally simulates the devices shown in FIGS. 1-3.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout design attributess, wires, levels of metal, vias, shapes, data for routing through the manufacturing line, and any other data required by a manufacturer or other designer/developer to produce a device or structure as described above and shown in FIGS. 1-3. Design structure 990 may then proceed to a stage 995 where, for example, design structure 990: proceeds to tape-out, is released to manufacturing, is released to a mask house, is sent to another design house, is sent back to the customer, etc.

The methods as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of designing an integrated circuit, comprising:
modifying a design—variable electromigration (EM) limit for each pre-defined circuit based on at least one reliability constraint in order to avoid EM violations of an integrated circuit, wherein the modification is performed by a design/synthesis tool implemented in a processor prior to arriving at an initial layout for a design of the integrated circuit; and
synthesizing the integrated circuit from a high level description to at least a subset of the pre-defined circuit devices using the modified design—variable EM limit of each pre-defined circuit,
wherein the modifying the design—variable EM limit includes limiting an output of capacitance or slew that each predefined circuit can drive to avoid the EM violations by calculating a maximum output capacitance or maximum output slew on each output pin using available specifications and rules for each pre-defined cirucuit.

2. The method of claim 1, wherein the plurality of pre-defined circuit devices and the high level description are available before the synthesizing.

3. The method of claim 1, wherein the at least one reliability constraint is at least one of power on hours, frequency, reliability temperature and reliability voltage.

4. The method of claim 1, further comprising making the rules available at a start of design, wherein the rules include at least timing and power requirements, size and functional view of logic.

5. The method of claim 1, wherein the at least one reliability constraint is in a library format.

6. A computer program product comprising a computer readable storage medium having readable program code embodied in the storage medium, the computer program product includes at least one component operable to:
modify a design—variable electromigration (EM) limit for each pre-defined circuit at a start of a design based on at least one reliability constraint to avoid EM violations of an integrated circuit, wherein the modification is performed prior to arriving at an initial layout for a design of the integrated circuit; and
provide the modification to a synthesizing tool to synthesize the integrated circuit from a high level description to at least a subset of pre-defined circuit devices using the modified design—variable EM limits,
wherein the modifying the design—variable EM limit includes limiting an output of capacitance or slew that each predefined circuit can drive to avoid the EM violations by calculating a maximum output capacitance or maximum output slew on each output pin using available circuit information for each pre-defined circuit.

7. The computer program product of claim 6, wherein the available circuit information includes frequency, power on hours, temperature reliability and voltage reliability.

8. The computer program product of claim 6, wherein the modification is implemented using a library cell function.

9. The computer program product of claim 6, wherein the modification includes a process flow that reads .lefs or GDSII to discern the output pin metallization.

10. A computer system for designing an integrated circuit that avoid electro migration violations, the system comprising:
a CPU, a computer readable memory and a computer readable storage media;
program instructions to provide a plurality of pre-defined circuit devices which are used within the integrated circuit, including an at least one design—variable electromigration (EM) limit;
program instructions to provide a high level description of the integrated circuit;
program instructions to provide at least one reliability constraint for the integrated circuit;
program instructions to modify the design—variable EM limit for each pre-defined circuit based on the at least one reliability constraint, wherein the modification is performed prior to arriving at an initial layout for a design of the integrated circuit; and
program instructions to synthesize the integrated circuit from the high level description to at least a subset of the pre-defined circuit devices using the modified design—variable EM limit of each circuit,
wherein:
the modifying the design—variable EM limit includes limiting an output of capacitance or slew that each pre-defined circuit can drive to avoid the EM violations by calculating a maximum output capacitance or maximum output slew on each output pin using available specifications and rules for each predefined circuit; and
the program instructions are stored on the computer readable storage media for execution by the CPU via the computer readable memory.

11. The computer system of claim 10, wherein the at least one design—variable EM limit is temperature, voltage, or POH.

12. A method comprising:
providing a computer infrastructure operable to:
modify maximum capacitance or maximum output slew rate that each individual cell is allowed to drive in order to avoid electromigration (EM) fails, wherein the modification is performed prior to arriving at an initial layout for a design of an integrated circuit; and
provide the modification to a synthesizing tool to synthesize the integrated circuit from a high level description to at least a subset of pre-defined circuit devices using the modified design—variable EM limits,
wherein the modifying the maximum capacitance or maximum output slew rate includes limiting an output of capacitance or slew that each predefined circuit can drive to avoid the EM fails by calculating the maximum output capacitance or the maximum output slew on each output pin using available specifications and rules for each predefined cirucit.

13. The method of claim 12, further comprising using at least one reliability constraint for calculating the modification.

* * * * *